United States Patent [19]

Kawai

[11] 4,384,767
[45] May 24, 1983

[54] CLAMPING DEVICE FOR CAMERA ACCESSORY OR HOOD

[75] Inventor: Tohru Kawai, Kawasaki, Japan

[73] Assignee: Canon Kabushiki Kaisha, Tokyo, Japan

[21] Appl. No.: 274,305

[22] Filed: Jun. 16, 1981

[30] Foreign Application Priority Data

Jun. 18, 1980 [JP] Japan .............................. 55-85351[U]

[51] Int. Cl.³ .............................................. G02B 11/04
[52] U.S. Cl. .................................... 350/580; 350/318; 350/257
[58] Field of Search ................ 350/580, 581, 257, 318

[56] References Cited

U.S. PATENT DOCUMENTS

| 2,437,159 | 3/1948 | Herbert | 350/580 |
| 2,510,873 | 6/1950 | Early | 350/318 |
| 2,756,633 | 7/1956 | Brandes et al. | 350/257 |
| 4,050,791 | 9/1977 | Watanabe | 350/318 |

Primary Examiner—Jon W. Henry
Attorney, Agent, or Firm—Toren, McGeady and Stanger

[57] ABSTRACT

A clamping device for a camera accessory such as a hood includes a generally tubular attachment portion forming a part of the accessory for attachment to a camera lens mount or a pre-assembled, telescoping hood arranged on a lens mount. A number of projecting members extend radially inwardly from the inner circumference of the attachment portion to contact the outer periphery of the lens mount or pre-assembled hood. An engagement member extends through the attachment portion and is urged by a spring to contact the outer periphery of the lens mount or pre-assembled hood so that the engagement member, together with the projecting members, operate to fix the accessory on the lens mount or pre-assembled hood.

8 Claims, 6 Drawing Figures

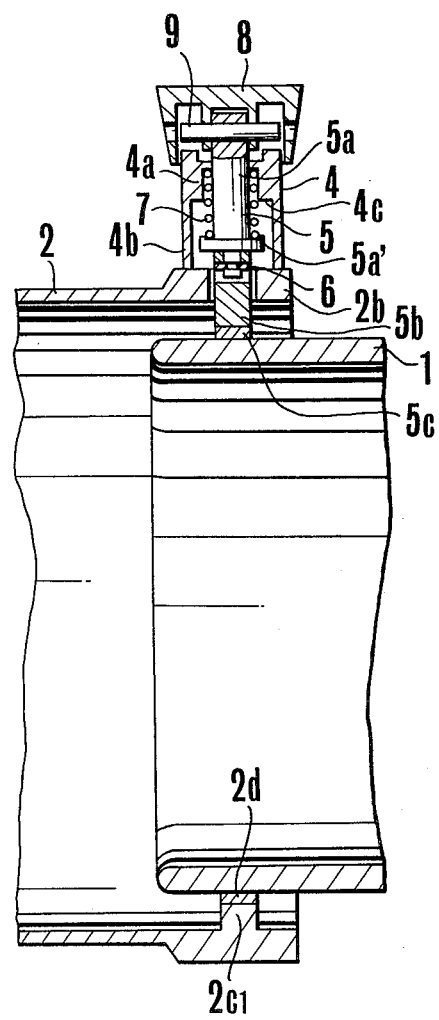

CLAMPING DEVICE FOR CAMERA ACCESSORY OR HOOD

BACKGROUND OF THE INVENTION

1. Field of the Invention:

The present invention relates to a clamping device which can be used to secure a hood on the outer periphery of a camera lens mount.

2. Description of the Prior Art:

Lens mounts in use up to now generally can accept accessory hoods, and a wide variety of devices for securing the hoods to the mounts have been proposed. The most commonly used device includes a threaded portion at one end of the hood which is adapted to engage a correspondingly threaded filter attachment portion at the front end of the lens mount. It is also known to provide a set screw threaded through an opening in the hood to be pressed in the radial direction against the outer periphery of the front end of the lens mount. In either case, attachment of the hood is troublesome and time-consuming. Particularly when using the threaded filter attachment portion, another problem arises in that since the hood is relatively heavy and difficult to handle, the helical ribs forming the screw thread are often damaged.

SUMMARY OF THE INVENTION

An object of the present invention is to provide a hood clamping device of uncomplicated structure which permits the hood to be attached and detached with ease and reliability.

Another object of the invention is to provide a clamping device for an accessory such as a hood, the device being capable of removably attaching the accessory to the front end of either a lens mount or an existing telescoping hood, and of permitting the accessory to be carried around the outer periphery of the lens mount or telescoping hood in fixed relation.

In accordance with the invention, a clamping device for a camera accessory such as a hood for attachment on the outer periphery of a camera lens mount or a telescoping pre-assembled hood arranged on a camera lens mount, includes a generally tubular attachment portion forming a part of the camera accessory for attachment to the lens mount or the pre-assembled hood, and a number of radially inwardly projecting members on the inner circumference of the attachment portion for contacting the outer periphery of the lens mount or pre-assembled hood. An engagement member extends through the attachment portion, and is urged by biasing means to contact the outer periphery of the lens mount or pre-assembled hood so that the engagement member, together with the projecting members, operate to mount the camera accessory.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

BRIEF DESCRIPTION OF THE DRAWING

In the drawing:

FIG. 6 is a fragmentary sectional view of another embodiment of the invention.

DETAILED DESCRIPTION OF THE INVENTION

Figure 1:
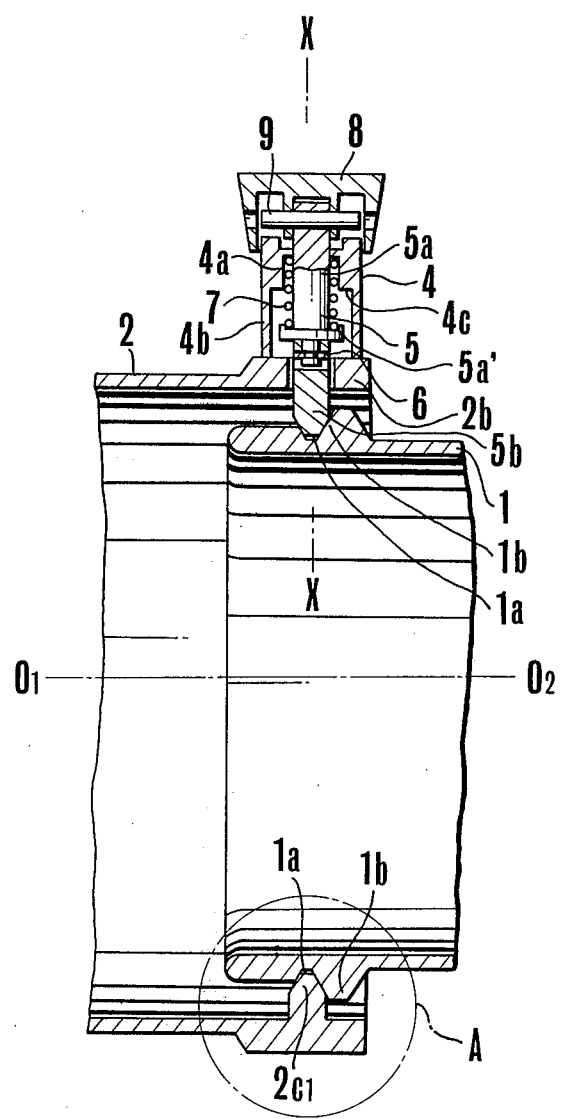
FIG. 1 is a fragmentary sectional view of an embodiment of the invention taken along the direction of an optical axis.
Figure 2:
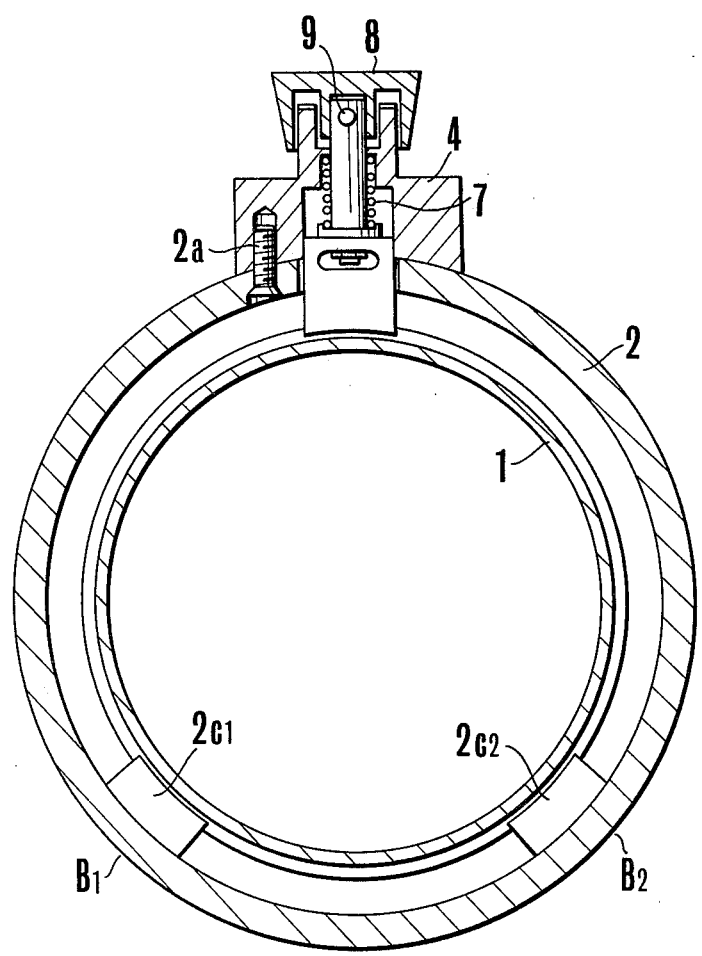
FIG. 2 is a sectional view of the embodiment of FIG. 1 taken transversely of the optical axis.

FIGS. 1 and 2 show an outer barrel 1 of a lens mount in a photographic camera or the like, having a circumferential groove 1a formed in the outer surface of the forward or front end of the barrel for attachment of, e.g., a lens hood. Also shown is a tubular lens hood 2, and a casing 4 for holding a pin member 5 which serves as an engagement member. Casing 4 is fixed on the outer circumference of the lens hood 2 by screw fasteners 2a (FIG. 2).

The cross-section of the interior of the casing 4 is shown in FIG. 1. The pin member 5 is formed by a shaft portion 5a and a head or tip portion 5b. The pin member 5 is inserted through a tension washer 6. A coil spring 7 is fitted on the circumference of the shaft portion 5a, one end of the coil spring being restrained by a collar 5a' formed at the end of the shaft portion 5a adjacent the tip portion 5b. The other end of the coil spring 7 is inserted in a cylindrical gap formed between a first inner diameter portion 4a in the casing 4, and the shaft portion 5a. The interior of the casing 4 has the first inner diameter portion 4a and a larger, second inner diameter portion 4b with a stepped portion 4c at the boundary of the first and second inner diameter portions. The collar 5a' of pin member 5 is arranged to abut the stepped portion 4c when the pin member 5 is raised. An operating knob 8 for raising the pin member 5 is fixed to the pin member 5 by a pin 9.

Figure 3:
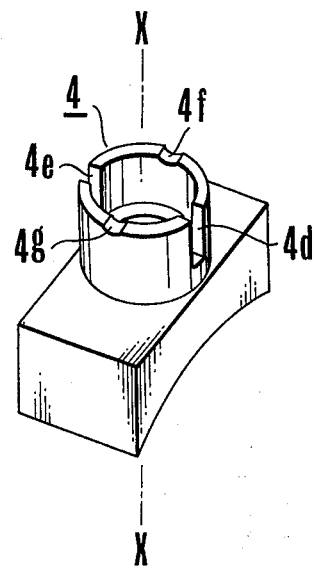
FIG. 3 is a perspective view of a casing in the embodiment of FIGS. 1 and 2, illustrating slots and recesses.
Figure 4:
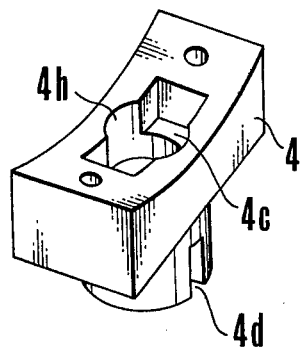
FIG. 4 is a perspective view of the casing rotated 180° from the position of FIG. 3, showing the shape of a hole into which an end portion of a pin member is fitted according to the invention.

The pin 9 extends transversely through diametrically oppositely located openings in an inner collar part of the knob 8, and through the upper portion of the pin member 5, as shown in FIG. 1. Pin 9 is received in long slots 4d and 4e formed at diametrically opposed locations in the side wall of the casing 4. Slots 4d and 4e extend in the direction of the axis of the second inner diameter portion 4b, as shown in FIG. 3. When the knob 8 is lifted upward, the pin 9 is guided by the long slots 4d and 4e. Upon exiting from the long slots 4d and 4e, the pin 9 becomes rotatable about an axis X—X, so that when rotated 90° about axis X—X, it can be seated in recesses 4f and 4g formed at diametrically opposed locations in the side wall of the casing 4, and spaced about 90° from the recesses 4e, 4d. The tip portion 5b of the pin member 5 is in a tapered shape so that the pin member 5 can move smoothly within a guide hole 4h in the casing 4 (FIG. 4), and has a hexagonal cross-section.

The operation of the hood clamping device constructed as described above is as follows.

When the hood 2 is attached to the lens mount on the outer barrel 1, the lens-side end portion 2b of the hood 2 is coaxially aligned with the outer circumference of the outer barrel 1. The operating knob 8 is pulled upward so that the tip portion 5b of the pin member 5 is recessed from the inner surface of the hood 2. The hood 2 is then pushed in the axial direction so as to overlap the outer diameter of the lens mount until the tip portion 5b moves radially inwardly to engage the groove 1a in the outer barrel 1 under the action of coil spring 7. This completes the attachment of the hood 2. It is noted that when a plurality of clamping devices, each comprising the pin member 5, casing 4, coil spring 7 and knob 8 are provided on the outer circumference of the hood 2, the degree of stabilization of the attached hood is increased.

Preferably, as shown in FIG. 1, a collar 1b is formed on the outer circumference of the lens barrel 1. The collar 1b is arranged so that when the lens hood 2 overlaps the lens barrel 1 at the end portion 2b of hood 2, the tip portion 5b of the pin member 5 abuts against the collar 1b. Thus, the position of the tip portion 5b relative to the groove 1a is determined. The pin member 5 is first lifted and then rotated 90° to set the pin 9 in the recesses 4f and 4g, and the lens hood 2 is then brought into a mounting position over the lens barrel 1. The depth of the recesses 4f, 4g is such that the tip portion 5b is held clear of the outer circumference of the lens barrel 1 at the end of the lens barrel further from the camera.

As the tip portion 5b abuts the collar 1b, the knob 8 is then rotated to the position at which the pin 9 is received in the long slots 4d and 4e, so that the tip portion 5b of the pin member 5 is free to engage the groove 1a. Of course, the long slots 4d, 4e should extend a sufficient length so that the tip portion 5b forcibly contacts the base of the groove 1a under the action of coil spring 7. The collar 1b thus facilitates attachment of the lens hood 2.

Even when only one of the present hood clamping device is provided, attachment of the lens hood is possible. However, with telephoto and supertelephoto lenses, where the hood is of increased diameter and weight, the hood tends to become misaligned with respect to the optical axis of the lens. To avoid this, as indicated at A in FIG. 1, and at B1 and B2 in FIG. 2, the inner peripheral surface of the end of the lens hood is provided with projected portions 2C1 and 2C2 which are formed to fit in the circumferential groove 1a in the outer peripheral surface of the lens barrel 1. When the lens hood 2 is attached to the lens barrel 1, projected portions 2C1 and 2C2 are set in the groove 1a. While the knob 8 is held in the raised position, the hood 2 is positioned so that the tip portion 5b of the pin member 5 abuts the lens barrel collar 1b. The knob 8 is then released, so that the lens hood 2 is supported at three points by the projected portions 2C1 and 2C2, and the pin member 5. Thus, axial misalignment of the lens hood 2 is avoided. In one application of the present invention, the lens mount is provided with a built-in or pre-assembled hood at the front end of its outer barrel, which hood is movable axially in the forward and rearward directions. In a photographing situation which requires an additional hood to be attached at the front of the built-in hood, the front portion of the outer circumference of the built-in hood can be provided with a detent portion having a circumferential groove which the tip portion of the pin member 5 engages, and with a collar near (preferably adjacent, as shown in FIG. 1) the circumferential groove, similar to the arrangement of FIGS. 1 and 2. Advantageously, the casing 4, pin member 5, coil spring 7 and knob 8 are mounted to the attachment hood. When it is desired to perform photography in the rain or snow, the photographer often desires to extend the built-in hood, such as by attaching an additional hood to the front end of the built-in hood, so that rain or snow is kept away from the lens objective. In this case, the attachment hood, which until now has been carried separately, is assembled together with the built-in hood.

The conventional arrangement for mounting an attachment hood, as mentioned above, employs a screw thread or bayonet mount. Therefore, the conventional attachment hood cannot be conveniently handled. Further, preparation of the attachement hood for mounting is burdensome.

According to the present invention, a built-in hood or pre-assembled hood 10 (FIG. 5) is provided with a circumferentially extending groove 10a and a collar 10b on the outer circumference of the front end of the built-in hood 10, similar to the arrangement of FIG. 1. The attachment hood 2 is provided with the radially biased pin member 5 arranged for movement through a hole in the hood 2 to engage the groove 10a. With the clamping device of the invention, the operator need only push the attachment hood in axial alignment with the built-in hood to obtain automatic clamping, as the tip portion of the pin member 5 engages the groove 10a while its position in the axial direction is determined by abutting engagement with the collar 10b. The provision of two projections 2C1 and 2C2 in the attachment hood, as indicated at A, B1 and B2 in FIGS. 1 and 2, facilitates an increase in the stability of axial registration of the attachment hood.

Figure 5:
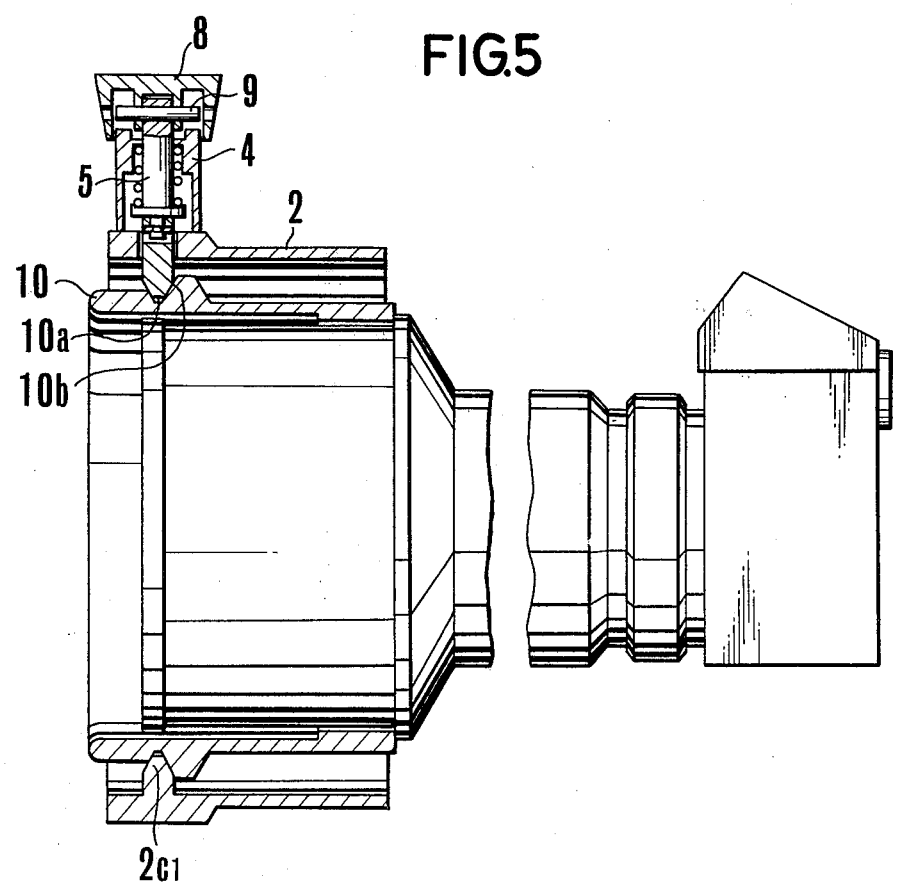
FIG. 5 is a side view, partly in section, showing the use of the invention as a slip preventing device.

A great advantage of this embodiment resides in the convenience for carrying the attachment hood about when not in use. That is, as shown in FIG. 5, when the attachment hood is placed over the built-in hood, in an axially reversed configuration, the main body of the attachment hood overlaps the outer surface of the built-in hood. When the attachment hood fully overlaps the built-in hood 10, the tip portion of the pin member 5 drops in the groove 10a, and further movement is prevented by the abutment against the collar 10b. The attachment hood thus is clamped in this position. It will be appreciated that the attachment hood 2 can be securely carried around the built-in hood, and that the groove 10a, collar 10b, pin member 5, coil spring 7 and casing 4 will act as a lock device for preventing accidental displacement of the attachment hood.

It will be understood from the foregoing that the present clamping device provides:

(1) axial registration of an attachment hood with a built-in hood when the attachment hood is mounted at the front end of the built-in hood;

(2) prevention of accidental displacement when the attachment hood is positioned out of use while being carried fully telescoped over the built-in hood; and (3) axial registration of an attachment hood with a lens mount when the attachment hood is mounted at the front end of the lens mount, together with prevention of accidental displacement when it is carried on the outer barrel of the lens mount.

In case (3), an additional advantage is realized in that as the attachment hood covers the lens mount, the surface of the outer barrel of the lens mount is protected from damage.

FIG. 6 shows an example of a modification of the clamping device of the invention in which the circumferential groove 1a (or 10a) is eliminated, together with the collar 1b (or 10b) on the outer circumferential surface of the lens mount or built-in hood 1.

When the lens mount or built-in hood has a smooth outer surface, without a circumferential groove and an annular protuberance or collar, the tip portion of the pin member 5 need not be tapered. As shown in FIG. 6, an elastic pad 5c of material having a relatively high coefficient of friction, such as rubber or plastic, can be fixed to the end of the pin member 5 to contact the lens mount or built-in hood. The projections 2C1 and 2C2 on the inner peripheral surface of the rear portion of the attachment hood are also provided with similar pads 2d.

In the example of FIG. 6, a mechanism for accommodating and guiding the pin 5 is provided which is similar in construction to that shown in FIGS. 1 to 5.

It should be pointed out that, since the clamping device shown in FIG. 6 operates without the use of a circumferential groove 1a (or 10a) for engaging the pin 5 or an annular protuberance or collar 1b (or 10b), an accessory including the device of FIG. 6 can be attached to overlap a desirable distance on either a lens mount or a built-in hood.

While specific embodiments of the invention have been shown and described in detail to illustrate the application of the inventive principles, it will be understood that the invention may be embodied otherwise without departing from such principles.

What is claimed is:

1. A clamping device for a camera accessory such as a hood for attachment on the outer circumference of either one of a camera lens mount and a telescoping pre-assembled hood arranged on a camera lens mount, the lens mount having an optical axis, comprising:
   (a) a generally tubular shaped attachment portion forming a part of the camera accessory for attachment to one of the lens mount and the pre-assembled hood, and a number of radially inwardly projecting members on the inner circumference of said attachment portion for contacting the outer circumference of one of the lens mount and the pre-assembled hood; and
   (b) an engagement member mounted on and extending through said attachment portion and means on said attachment portion for applying a biasing force to said engagement member to urge said engagement member in a direction transverse to the optical axis so that said engagement member contacts the outer circumference of one of the lens mount and the pre-assembled hood wherein said engagement member together with said projecting members operate to detachably mount the camera accessory on one of the lens mount and pre-assembled hood.

2. A clamping device according to claim 1, including a generally tubular shaped abutment portion forming a part of the outer circumference of one of the camera lens mount and pre-assembled hood for operatively contacting said projecting members and said engagement member to position said attachment portion in alignment with the optical axis.

3. A clamping device for a camera accessory such as a hood for attachment to one of a camera lens mount and a telescoping pre-assembled hood arranged on a camera lens mount, the lens mount having an optical axis, comprising:
   (a) a generally tubular shaped engagement portion forming a part of the outer circumference of one of the lens mount and the pre-assembled hood, said engagement portion including an annular collar extending radially outwardly from said outer circumference in a plane perpendicular to the optical axis and having a circumferential groove adjacent said collar in the direction of the optical axis;
   (b) a generally tubular shaped attachment portion forming a part of the camera accessory for attachment to one of the lens mount and the pre-assembled hood, and a number of radially inwardly projecting members on the inner circumference of said attachment portion for contacting said outer circumference of one of the lens mount and pre-assembled hood, said projections being arranged to contact said collar to prevent movement of said attachment portion beyond a certain position in the direction of the optical axis; and
   (c) an engagement member mounted on and extending through said attachment portion and means on said attachment portion for applying a biasing force to said engagement member for urging said engagement member radially inwardly in a direction transverse to the optical axis so that an end portion of said engagement member engages within said groove in said engagement portion when said attachment portion overlaps said engagement portion, wherein said projections also engage said groove to prevent axial displacement of said attachment portion relative to said engagement portion.

4. A clamping device according to claims 1, 2, or 3, including:
   (a) a casing on said attachment portion for receiving said engagement member and for guiding said engagement member in the direction transverse to the optical axis; and
   (b) said biasing means comprises a spring contained in said casing.

5. A clamping device according to claim 4, including a pin extending through said engagement member, said casing having a pair of long guide slots each extending in the direction transverse to the optical axis for receiving said pin to guide said engagement member.

6. A clamping device for a camera accessory such as a hood for attachment on the outer circumference of either one of a camera lens mount and a telescoping pre-assembled hood arranged on a camera lens mount, the lens mount having an optical axis, comprising:
   (a) a generally tubular shaped adapter portion forming a part of the camera accessory for attachment to a mounting portion of one of the lens mount and pre-assembled hood;
   (b) a casing mounted on said adapter portion;
   (c) an engagement member contained in said casing and extending radially inwardly through said adapter portion, and means for applying a biasing force to said engagement member in a direction transverse to the optical axis for urging said engagement member against the outer circumference of the mounting portion of one of the lens mount and pre-assembled hood;
   (d) a number of radially inwardly projecting members on the inner circumference of said adapter portion for contacting the outer circumference of the mounting portion of one of the lens mount and pre-assembled hood and for cooperating with said engagement member to register said adapter portion relative to the optical axis; and (e) means on said casing for holding said engagement member at a certain position relative to said adapter portion.

7. A clamping device according to claim 6, wherein said holding means comprises a portion of said casing and a pin extending through said engagement member, said portion of said casing having a pair of recesses for seating said pin wherein said engagement member is held clear of the mounting position.

8. A clamping device according to claim 7, wherein said portion of said casing has a pair of long guide slots each extending in a direction transverse to the optical axis for receiving said pin to guide said engagement member when said adapter portion is attached to the mounting portion.

* * * * *